(12) United States Patent
Zapata Pena

(10) Patent No.: US 12,234,965 B1
(45) Date of Patent: Feb. 25, 2025

(54) LATTICE ANIMATION

(71) Applicant: ZKW Group GmbH, Wieselburg (AT)

(72) Inventor: Reinaldo Arturo Zapata Pena, Leon (MX)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/779,479

(22) Filed: Jul. 22, 2024

(30) Foreign Application Priority Data

Aug. 3, 2023 (EP) ..................................... 23189571

(51) Int. Cl.
*F21S 43/20* (2018.01)
*F21S 43/14* (2018.01)
*F21V 5/04* (2006.01)

(52) U.S. Cl.
CPC ......... *F21S 43/26411* (2024.05); *F21S 43/14* (2018.01); *F21S 43/26231* (2024.05); *F21S 43/26241* (2024.05); *F21V 5/043* (2013.01)

(58) Field of Classification Search
CPC ................. F21S 43/26411; F21S 43/14; F21S 43/26241; F21S 43/26231
See application file for complete search history.

(56) References Cited

U.S. PATENT DOCUMENTS

2017/0349095 A1 * 12/2017 Wimmer .................. B60Q 3/54
2019/0186706 A1 * 6/2019 Kim ...................... F21S 41/285

FOREIGN PATENT DOCUMENTS

| DE | 4105213 A1 | 8/1992 | |
|---|---|---|---|
| JP | S61158606 A | 7/1986 | |
| JP | H1125715 A | 1/1999 | |
| KR | 1486818 B1 * | 1/2015 | ............. F21S 41/25 |
| KR | 101486818 B1 | 1/2015 | |
| KR | 20160136900 A | 11/2016 | |
| KR | 20170079416 A | 7/2017 | |

OTHER PUBLICATIONS

Extended European Search Report for European Patent Application No. 23189571.5 dated Dec. 12, 2023 (6 Pages).

* cited by examiner

*Primary Examiner* — Matthew J. Peerce
(74) *Attorney, Agent, or Firm* — Eversheds Sutherland (US) LLP

(57) ABSTRACT

Signal lamp for a vehicle configured to create an illumination pattern. It includes an illuminant configured to emit parallel light, a first optical element configured to receive light from the illuminant, and a second optical element configured to receive light from the first optical element. The light entry surface of the first optical element has a plurality of concave cylinder diverging lenses (CDLs), wherein the light exit surface of the second optical element has a plurality of convex cylinder converging lenses (CCLs). The CDLs are oriented on the light entry surface such that their cylinder axes are rotated by a first angle around a main axis, wherein the CCLs are oriented on the light exit surface such that their cylinder axes are rotated by a second angle around the main axis. The first and second angles are such that in a frontal view towards the light exit surface of the second optical element the CDLs overlap with the CCLs in order to form a lattice.

20 Claims, 4 Drawing Sheets

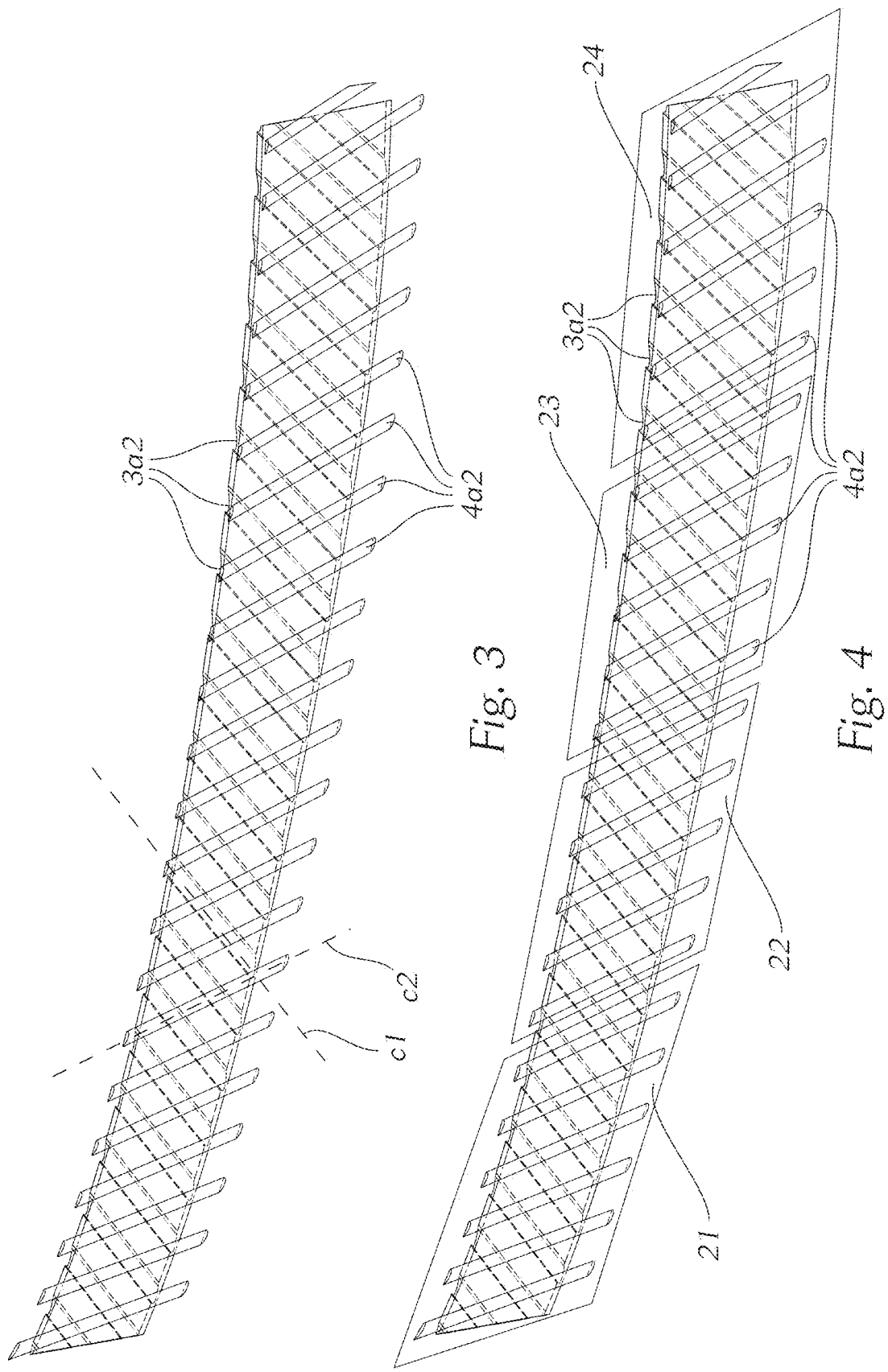

LATTICE ANIMATION

CROSS-REFERENCE TO RELATED APPLICATIONS

This application claims priority to European Patent Application No. 23189571.5, filed Aug. 3, 2023, which is incorporated herein by reference.

FIELD OF THE INVENTION

The invention relates to a signal lamp for a vehicle, said signal lamp is configured to create an illumination pattern, which is essentially lattice shaped, wherein the signal lamp comprises:
- an illuminant configured to emit parallel light along a main beam direction, said illuminant comprises a plurality of light sources, wherein each light source of the plurality of light sources is configured to emit a parallel light bundle along the main light beam direction,
- a first optical element, disposed downstream of the illuminant along the main beam direction, wherein the first optical element comprises a light entry surface, configured to receive light from the illuminant, and a, preferably flat or curved, light exit surface, configured to emit received light, which is emitted from the illuminant and received via the light entry surface, further along the main beam direction, wherein the light entry surface of the first optical element is configured to widen received light bundles upon entry,
- a second optical element, disposed downstream of the first optical element along the main beam direction, wherein the second optical element comprises a, preferably flat or curved, light entry surface, configured to receive light from the first optical element, and a light exit surface, configured to emit the received light, coming from the first optical element, further along the main beam direction, wherein the light exit surface of the second optical element is configured to narrow received light bundles upon exit,
- wherein the light exit surface of the first optical element and the light entry surface of the second optical element have a corresponding shape and are arranged to each other such that a normal distance between the light exit surface of the first optical element and the light entry surface of the second optical element is greater than zero and the same along the, preferably entire, light exit surface and light entry surface respectively.

The invention further relates to a vehicle, comprising a signal lamp.

BACKGROUND

In the prior art, signal lamps for vehicles are well known. Signal lamps are configured to create a signal light, which can be understood as a light function, which main function is not intended to illuminate a specific area in vehicle traffic, such as a low-beam light distribution or a high-beam light distribution. Typically, a signal lamp creates e.g., a turn signal light, a hazard light, or some illumination/light function which is intended to be spotted or observed by traffic participants rather than illuminate said traffic participants. In order to achieve a specific light or illumination pattern, e.g., a lattice shaped illumination pattern, known signal lamps comprise a light source for emitting light and an optical element to receive the emitted light and subsequently emit said light in form of a specific pattern. Prior art optical elements are usually flat or areal plate-like structures, having a light receiving and light emitting surface. On either the light receiving or light emitting surface, a lattice shaped structure is usually present, to achieve the lattice shaped illumination pattern.

Known signal lamps have the disadvantage of providing illumination patterns with no visual spatial depth. This narrows the range of possible light functions (or illumination patterns) which can be created.

SUMMARY OF THE INVENTION

It is an object of the invention to provide a signal lamp, which improves the visualization of created illumination patterns, in particular lattice shaped illumination patterns.

According to the invention, the light entry surface of the first optical element comprises a base portion, in which a plurality of concave cylinder diverging lenses is formed, wherein adjacent cylinder diverging lenses are spaced, preferably at equal distance, from each other, wherein between adjacent cylinder diverging lenses the base portion of the light entry surface is configured as non-transparent for visible light from the illuminant by means of light blocking means, wherein each cylinder diverging lens has a cylinder axis, preferably oriented essentially orthogonal to the main beam direction, wherein the cylinder diverging lenses are configured to widen, in particular scatter, impinging light bundles along the main beam direction upon entry of the first optical element, wherein preferably the base portion between cylinder diverging lenses is flat or has a smaller curvature than the curvature of the cylinder diverging lenses, wherein the cylinder diverging lenses are formed in the light entry surface such that the cylinder axes of the cylinder diverging lenses are parallel to each other, wherein the light exit surface of the second optical element comprises a base portion, in which a plurality of convex cylinder converging lenses is formed, wherein adjacent cylinder converging lenses are spaced, preferably at equal distance, from each other, wherein each cylinder converging lens has a cylinder axis, preferably oriented essentially orthogonal to the main beam direction, wherein the cylinder converging lenses are configured to converge and narrow, in particular focus, impinging light bundles along the main beam direction upon exit of the second optical element, wherein preferably the base portion between cylinder converging lenses is flat or has a smaller curvature than the curvature of the cylinder converging lenses, wherein the cylinder converging lenses are formed in the light exit surface such that the cylinder axes of the cylinder converging lenses are parallel to each other,
- wherein the cylinder diverging lenses are oriented on the light entry surface of the first optical element such that the cylinder axes of the cylinder diverging lenses are rotated by a first angle around a main axis, which is parallel to the main beam direction,
- wherein the cylinder converging lenses are oriented on the light exit surface of the second optical element such that the cylinder axes of the cylinder converging lenses are rotated by a second angle around the main axis,
- wherein the first angle and the second angle are such that in a frontal view towards the light exit surface of the second optical element the cylinder diverging lenses overlap with the cylinder converging lenses in order to form a lattice.

This has the advantage of creating a lattice shaped illumination pattern, having spatial depth, and therefore has a 3-dimensional visual representation. In particular, the essentially rod-shaped (or fence-shaped) illumination pattern emitted by the first optical element can overlap the essentially rod-shaped (or fence-shaped) illumination pattern emitted by the second optical element to create a 3-dimensional looking lattice, which increases the visibility and the perceptibility of said illumination pattern. Cylinder diverging (or diffusor) lenses can be arched inwards (into a, preferably full, body forming the first optical element, said body can have a longitudinal extension along the main beam direction) along the main beam direction. Cylinder converging (or collecting) lenses can be arched outwards (out of a, preferably full, body forming the second optical element, said body can have a longitudinal extension along the main beam direction) along the main beam direction. A diverging lens can also be described as a negative lens. A converging lens can also be described as a positive lens. Preferably, the light exit surface of the first optical element is free of optical elements (such as lenses, prisms, or other optically active structures) and can be optical inactive, in the meaning that the propagation direction of light rays that permeate the light exit surface remains unchanged. The light exit surface of the first optical element can be smooth. Preferably, the light entry surface of the second optical element is free of optical elements (such as lenses, prisms, or other optically active structures) and can be optical inactive, in the meaning that the propagation direction of light rays that permeate the light entry surface remains unchanged. The light entry surface of the second optical element can be smooth. In the case of a flat (in the sense of planar or not curved) light exit surface of the first optical element and a flat light entry surface of the second optical element, the light exit surface of the first optical element and the light entry surface of the second optical element can essentially be parallel to each other. In the case of a curved light exit surface of the first optical element and a curved light entry surface of the second optical element, the light exit surface of the first optical element and the light entry surface of the second optical element can essentially have the same curvature and in particular follow the same parallel curve or the same virtual parallel curved surface. Preferably, the shape of the light exit surface of the first optical element and the shape of the light entry surface of the second optical element are formed corresponding to each other, which means that if the light exit surface would be in direct contact with the light entry surface, a gapless or flush contact would be established between the two surfaces. Preferably, the first optical element and the second optical element are aligned parallel (or parallel curved) to a flat (or curved) virtual surface, said virtual surface comprising a face vector and is oriented such that its face vector is essentially parallel to the main beam direction. Narrowing of light bundles can be defined as reducing the width of a light bundle in a first direction and/or a second direction, both of which are orthogonal to the main beam direction. If narrowing takes place only along the first direction, the light bundle's width may stay the same along the second direction. Widening of light bundles can be defined as increasing the width of a light bundle in a first direction and/or a second direction, both of which are orthogonal to the main beam direction. If widening takes place only along the first direction, the light bundle's width may stay the same along the second direction. The orientations of the cylinder diverging lenses and the cylinder converging lenses (on the light exit/entry surface of the lenses corresponding optical element) relative to each other can also be described by a first enclosing angle and a second enclosing angle. Said first enclosing angle can be defined as an angle between a cylinder axis of a cylinder diverging lens and a vertical axis (vertical in a state in which the signal lamp is mounted to a vehicle, said vehicle moves along a horizontal direction, which is essentially parallel to the main beam direction). Said second enclosing angle can be defined as an angle between a cylinder axis of a cylinder converging lens and the vertical axis. The first enclosing angle and the second enclosing angle can be greater than zero, preferably, the first enclosing angle and the second enclosing angle have the same value (i.e., absolute value or modulus) but a reversed/opposite sign. The base portion of the light entry surface and the light exit surface of the first optical element can be parallel (in case of a flat/planar first optical element) or follow the same curved parallel (in case of a curved first optical element). The light entry surface of the second optical element and the base portion of the light exit surface of the second optical element can be parallel (in case of a flat/planar second optical element) or follow the same curved parallel (in case of a curved second optical element). The base portion of the light entry surface of the first optical element and the base portion of the light exit surface of the second optical element can have a corresponding shape to each other, in particular, they can be parallel or curved parallel, corresponding to the shape/curvature of the first optical element and the second optical element. The shape of the base portion of the light entry surface of the first optical element may correspond to the shape of the light entry surface of the second optical element. The shape of the base portion of the light exit surface of the second optical element may correspond to the shape of the light exit surface of the first optical element. In this disclosure, a lattice shaped illumination pattern can be understood as an illumination pattern which is intended to have a signaling function and not an illumination function (e.g., a low beam or a high beam of a vehicle headlamp). In other words, a lattice illumination pattern, which can be created with a signal lamp according to the invention, is preferably intended to be spotted or observed by a traffic participant (e.g., to give visual information to the traffic participant) rather than illuminate said traffic participant.

Advantageously, the first angle and the second angle are such that a cylinder diverging lens overlaps with at least two, preferably three, adjacent cylinder converging lenses.

Advantageously, the difference between the first angle and the second angle is at least 45°, preferably more than 75°, more preferably essentially 90°.

Advantageously, the lattice is a rectangular lattice, wherein each rectangle of the rectangular lattice comprises a first pair of parallel edges and a second pair of parallel edges, wherein a pair of adjacent cylinder diverging lenses form the first pair of parallel edges and a pair of adjacent cylinder converging lenses form the second pair of parallel edges.

Advantageously, at least some, preferably all, light sources of the plurality of light sources are configured to be individually controllable, wherein preferably the signal lamp comprises a light source controller, configured to control the illumination of the at least some, preferably all, individually controllable light sources. Due to individually controllable light sources, dynamic lattice illumination patterns (e.g., a 3-dimensional running light visual effect) can be realized.

Advantageously, the illuminant comprises a plurality of collimators, corresponding with the plurality of light sources, said collimators are disposed between the plurality of light sources and the first optical element, wherein each collimator is associated with a corresponding light source of the plurality of light sources, wherein each collimator is configured to receive light from its corresponding light source, parallelize the received light, and to emit the parallelized light towards the light entry surface of the first optical element. Preferably, the illuminant comprises a plurality of light sources arranged in an areal or planar light source surface (e.g., light sources are arranged in a regular lattice), such that the illuminant can be viewed (or perceived) as a surface-like light source, having an extension in two dimensions (compared to a point-like light source, e.g. a single LED). The illuminant may be configured as an illumination plate, with a plurality of light emitting light guides acting as light sources. Alternatively, the illuminant may comprise a plurality of reflectors, each reflector associated with a light source and configured to emit parallel light (which was received by the reflector by the light source).

Advantageously, each cylinder diverging lens of the plurality of cylinder diverging lenses has the same cylinder radius.

Advantageously, each cylinder converging lens of the plurality of cylinder converging lenses has the same cylinder radius.

Advantageously, the cylinder diverging lenses and the cylinder converging lenses have the same radius.

Advantageously, a normal distance between cylinder surfaces of adjacent cylinder diverging lenses is at least equal to or larger than a cylinder radius of a cylinder diverging lens, or wherein a normal distance between cylinder axes of adjacent cylinder diverging lenses is at least equal to or larger than a cylinder diameter of a cylinder diverging lens.

Advantageously, a normal distance between cylinder surfaces of adjacent cylinder converging lenses is at least equal to or larger than a cylinder radius of a cylinder converging lens, or wherein a normal distance between cylinder axes of adjacent cylinder converging lenses is at least equal to or larger than a cylinder diameter of a cylinder converging lens.

Advantageously, a normal distance between cylinder surfaces of adjacent cylinder diverging lenses is equal to a normal distance between cylinder surfaces of adjacent cylinder converging lenses. This has the advantage of creating an illumination pattern comprising a regular lattice.

Advantageously, the normal distance between the light exit surface of the first optical element and the light entry surface of the second optical element is at least twice the cylinder radius of the cylinder diverging lenses or the cylinder converging lenses.

Advantageously, the blocking means comprise a shade element or a non-transparent layer disposed between adjacent cylinder diverging lenses.

According to a second aspect of the invention, a vehicle is provided, comprising a signal lamp.

BRIEF DESCRIPTION OF THE DRAWINGS

In the following, in order to further demonstrate the present invention, illustrative and non-restrictive embodiments are discussed, as shown in the drawings.

FIG. 3 is a partial view of the signal lamp of FIG. 1.

FIG. 4 is another partial view of the signal lamp of FIG. 1.

DETAILED DESCRIPTION

Figure 1:
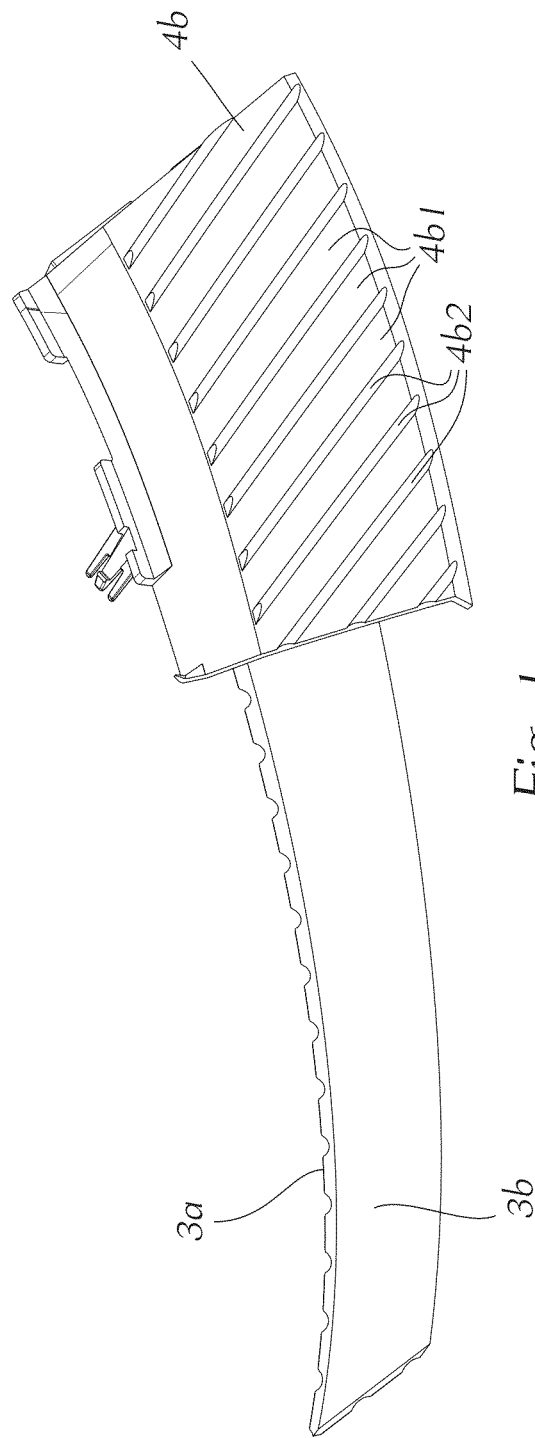
FIG. 1 is a perspective view of a section of a signal lamp according to an embodiment of the invention.
Figure 2:
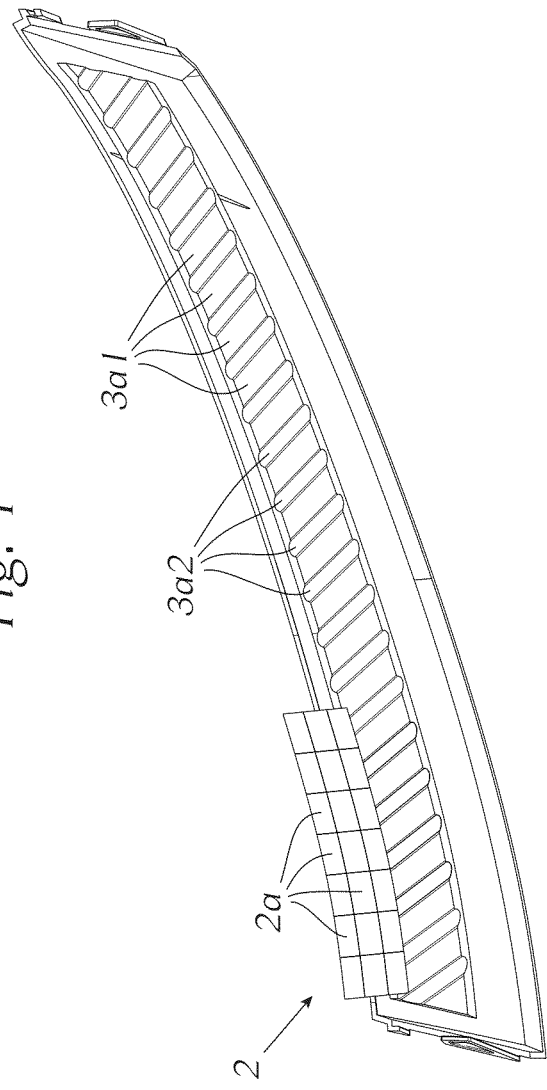
FIG. 2 is a rear view of the signal lamp of FIG. 1.

FIG. 1 and FIG. 2 show two different views of signal lamp 1 for a vehicle, said signal lamp 1 is configured to create an illumination pattern, which is essentially lattice shaped. The signal lamp comprises an illuminant 2 configured to emit parallel light along a main beam direction B (indicated as an upwards double arrow in FIG. 7). The illuminant 2 comprises a plurality of light sources 2a. Each light source of the plurality of light sources 2a is configured to emit a parallel light bundle along the main light beam direction B. At least some, preferably all, light sources of the plurality of light sources 2a are configured to be individually controllable. The signal lamp 1 may comprise a light source controller (not shown), configured to control the illumination (e.g., the ON/OFF state of each light source and/or the amount of light emitted by each light source) of the at least some, preferably all, individually controllable light sources 2a.

The signal lamp comprises a first optical element 3, disposed downstream of the illuminant 2 along the main beam direction B. The first optical element 3 comprises a light entry surface 3a, configured to receive light from the illuminant 2, and a curved light exit surface 3b (which can also be flat or planar), configured to emit received light, which is emitted from the illuminant 2 and received via the light entry surface, further along the main beam direction B. The light entry surface 3a of the first optical element 3 is configured to widen received light bundles upon entry.

The signal lamp 1 comprises a second optical element 4, disposed downstream of the first optical element 3 along the main beam direction B. The second optical element 4 comprises a curved light entry surface 4a (which can also be flat or planar), configured to receive light from the first optical element 3, and a light exit surface 4b, configured to emit the received light, coming from the first optical element 3, further along the main beam direction B. The light exit surface 4b of the second optical element 4 is configured to narrow received light bundles upon exit. In FIG. 1, only a portion of the second optical element 4 is shown, so that the first optical element 3 is visible.

The light exit surface 3b of the first optical element 3 and the light entry surface 4a of the second optical element 4 have a corresponding shape and are arranged to each other such that a normal distance between the light exit surface 3b of the first optical element 3 and the light entry surface 4a of the second optical element 4 is greater than zero and the same along the, preferably entire, light exit surface 3b and light entry surface 4a respectively. Through the greater than zero normal distance, a gap can be provided between the first optical element 3 and the second optical element 4, which can create a 3-dimensional lattice shaped illumination pattern.

The light entry surface 3a of the first optical element 3 comprises a base portion 3a1, in which a plurality of concave cylinder diverging lenses is formed, wherein adjacent cylinder diverging lenses are spaced, preferably at equal distance, from each other. Between adjacent cylinder diverging lenses the base portion of the light entry surface is configured as non-transparent for visible light from the illuminant by means of light blocking means. The blocking means comprise may be a shade element or a non-transparent layer disposed between adjacent cylinder diverging lenses 3a2.

FIG. 3 and FIG. 4 show partial views, showing details of the first optical element and the second optical element. In particular, FIG. 3 shows a partial view of the isolated first optical element 3 and the second optical element 4. FIG. 4 shows an embodiment, comprising an illuminant 2 with four planar (or areal) illumination sources 21, 22, 23, 24, wherein each illumination source 21, 22, 23, 24 is configured to emit a parallel light bundle along the main light beam direction B.

Each cylinder diverging lens $3a2$ has a cylinder axis $c1$, oriented essentially orthogonal to the main beam direction B. The cylinder diverging lenses $3a2$ are configured to widen, in particular scatter, impinging light bundles along the main beam direction B upon entry of the first optical element 3. The base portion $3a1$ between cylinder diverging lenses $3a2$ is flat or has a smaller curvature than the curvature of the cylinder diverging lenses $3a2$. The cylinder diverging lenses $3a2$ are formed in the light entry surface $3a$ such that the cylinder axes $c1$ of the cylinder diverging lenses $3a2$ are parallel to each other. Each cylinder diverging lens $3a2$ of the plurality of cylinder diverging lenses $3a2$ may have the same cylinder radius.

In order to create a lattice illumination pattern, the light exit surface $4b$ of the second optical element 4 comprises a base portion $4b1$, in which a plurality of convex cylinder converging lenses $4b2$ is formed. Adjacent cylinder converging lenses $4b2$ are spaced, preferably at equal distance, from each other. Each cylinder converging lens $4b2$ has a cylinder axis $c2$, oriented essentially orthogonal to the main beam direction B. The cylinder converging lenses $4b2$ are configured to converge and narrow, in particular focus, impinging light bundles along the main beam direction B upon exit of the second optical element 4. The base portion $4b1$ between cylinder converging lenses $4b2$ is flat or has a smaller curvature than the curvature of the cylinder converging lenses $4b2$. The cylinder converging lenses $4b2$ are formed in the light exit surface $4b$ such that the cylinder axes $c2$ of the cylinder converging lenses $4b2$ are parallel to each other. Each cylinder converging lens $4b2$ of the plurality of cylinder converging lenses $4b2$ may have the same cylinder radius.

The cylinder diverging lenses $3a2$ and the cylinder converging lenses $4b2$ may have the same radius.

Figure 7:
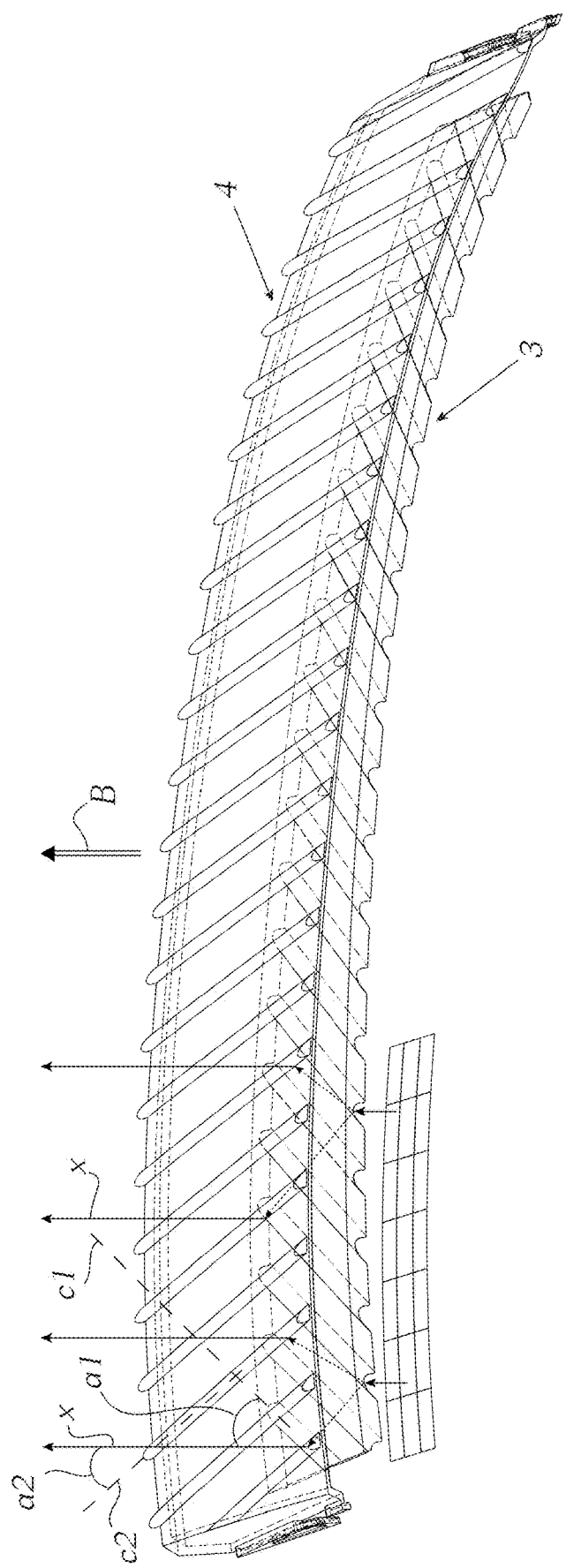
FIG. 7 is another partial view of the signal lamp of FIG. 1.

As can be seen in FIG. 7, the cylinder diverging lenses $3a2$ are oriented on the light entry surface $3a$ of the first optical element 3 such that the cylinder axes $c1$ of the cylinder diverging lenses $3a2$ are rotated by a first angle $a1$ around a main axis x, which is parallel to the main beam direction B. Furthermore, the cylinder converging lenses $4b2$ are oriented on the light exit surface $4b$ of the second optical element 4 such that the cylinder axes $c2$ of the cylinder converging lenses $4b2$ are rotated by a second angle $a2$ around the main axis x. The first angle and the second angle are different. The difference between the first angle $a1$ and the second angle $a2$ may be at least 45°, preferably more than 75°, more preferably essentially 90°.

In order to create a lattice shaped illumination pattern, the first angle $a1$ and the second angle $a2$ are such that in a frontal view towards the light exit surface $4b$ of the second optical element 4 the cylinder diverging lenses $3a2$ overlap with the cylinder converging lenses $4b2$ in order to form a lattice.

The first angle $a1$ and the second angle $a2$ may be such that a cylinder diverging lens $3a2$ overlaps with at least two, preferably three, adjacent cylinder converging lenses $4b2$.

The lattice may be a rectangular lattice, wherein each rectangle of the rectangular lattice comprises a first pair of parallel edges and a second pair of parallel edges. A pair of adjacent cylinder diverging lenses $3a2$ may form the first pair of parallel edges and a pair of adjacent cylinder converging lenses $4b2$ may form the second pair of parallel edges.

A normal distance between cylinder surfaces of adjacent cylinder diverging lenses $3a2$ may be at least equal to or larger than a cylinder radius of a cylinder diverging lens $3a2$, or a normal distance between cylinder axes $c1$ of adjacent cylinder diverging lenses $3a2$ may be at least equal to or larger than a cylinder diameter of a cylinder diverging lens $3a2$.

A normal distance between cylinder surfaces of adjacent cylinder converging lenses $4b2$ may be at least equal to or larger than a cylinder radius of a cylinder converging lens $4b2$, or a normal distance between cylinder axes $c2$ of adjacent cylinder converging lenses $4b2$ may be at least equal to or larger than a cylinder diameter of a cylinder converging lens $4b2$.

A normal distance between cylinder surfaces of adjacent cylinder diverging lenses $3a2$ may be equal to a normal distance between cylinder surfaces of adjacent cylinder converging lenses $4b2$.

The normal distance between the light exit surface $3b$ of the first optical element 3 and the light entry surface $4a$ of the second optical element 4 may be at least twice the cylinder radius of the cylinder diverging lenses $3a2$ or the cylinder converging lenses $4b2$.

Figure 5:
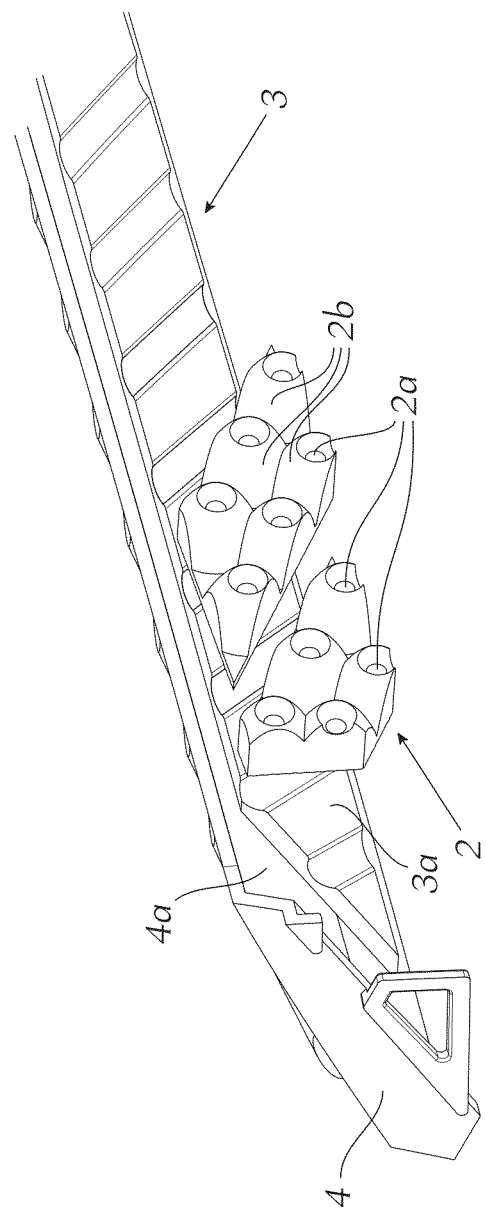
FIG. 5 is a rear view of a section of a signal lamp according to another embodiment.
Figure 6:
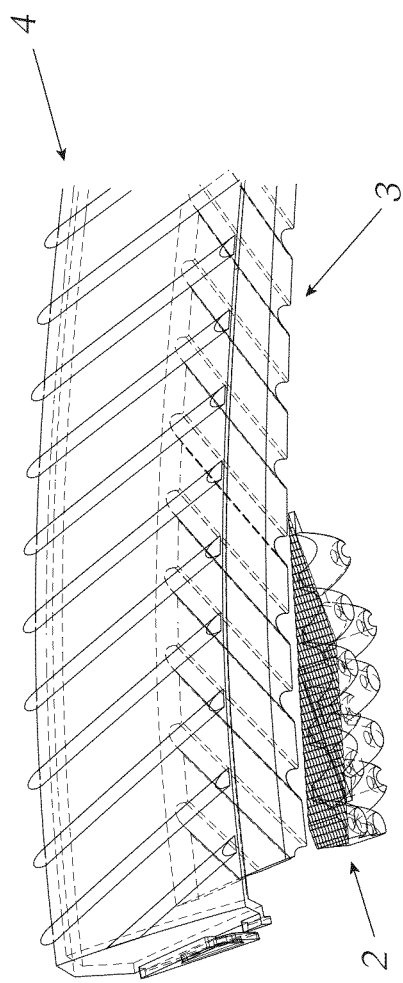
FIG. 6 is a partial view of the signal lamp of FIG. 5.

In the embodiment shown in FIG. 5 and FIG. 6, the illuminant 2 comprises a plurality of collimators $2b$, corresponding with the plurality of light sources $2a$. The collimators $2b$ are disposed between the plurality of light sources $2a$ and the first optical element 3. Each collimator $2b$ is associated with a corresponding light source of the plurality of light sources $2a$. Each collimator $2b$ is configured to receive light from its corresponding light source $2a$, parallelize the received light, and to emit the parallelized light towards the light entry surface $3a$ of the first optical element 3.

LIST OF REFERENCE SYMBOLS 1 signal lamp
2 illuminant
$2a$ light source
$2b$ collimator
21-24 illumination sources
3 first optical element
$3a$ light entry surface of the first optical element
$3a1$ base portion of the light entry surface
$3a2$ cylinder diverging lens
$3b$ light exit surface
4 second optical element
$4a$ light entry surface of the second optical element
$4b$ light exit surface of the second optical element
$4b1$ base portion of the light exit surface
$4b2$ cylinder converging lenses
5 blocking means
$a1$ first angle
$a2$ second angle
$c1$ cylinder axis of the cylinder diverging lens
$c2$ cylinder axis of the cylinder converging lens
B main beam direction
x main axis

The invention claimed is:

1. A signal lamp (1) for a vehicle, wherein the signal lamp (1) is configured to create an illumination pattern, which is essentially lattice shaped, the signal lamp comprising:

an illuminant (2) configured to emit parallel light along a main beam direction (B), said illuminant (2) comprises a plurality of light sources (2a), wherein each light source of the plurality of light sources (2a) is configured to emit a parallel light bundle along the main light beam direction (B);

a first optical element (3), disposed downstream of the illuminant (2) along the main beam direction (B), wherein the first optical element (3) comprises a light entry surface (3a), configured to receive light from the illuminant (2), and a light exit surface (3b) configured to emit received light, which is emitted from the illuminant (2) and received via the light entry surface (3a), further along the main beam direction (B), wherein the light entry surface (3a) of the first optical element (3) is configured to widen received light bundles upon entry;

a second optical element (4), disposed downstream of the first optical element (3) along the main beam direction (B), wherein the second optical element (4) comprises a light entry surface (4a) configured to receive light from the first optical element (3), and a light exit surface (4b), configured to emit the received light, coming from the first optical element (3), further along the main beam direction (B), wherein the light exit surface (4b) of the second optical element (4) is configured to narrow received light bundles upon exit, wherein the light exit surface (3b) of the first optical element (3) and the light entry surface (4a) of the second optical element (4) have a corresponding shape and are arranged to each other such that a normal distance between the light exit surface (3b) of the first optical element (3) and the light entry surface (4a) of the second optical element (4) is greater than zero and the same along the light exit surface (3b) and light entry surface (4a) respectively, wherein the light entry surface (3a) of the first optical element (3) comprises a base portion (3a1), in which a plurality of concave cylinder diverging lenses (3a2) is formed, wherein adjacent cylinder diverging lenses (3a2) are spaced from each other, wherein between adjacent cylinder diverging lenses (3a2) the base portion (3a1) of the light entry surface (3a) is configured as non-transparent for visible light from the illuminant (2) by means of light blocking means (5), wherein each cylinder diverging lens (3a2) has a cylinder axis (c1), wherein the cylinder diverging lenses (3a2) are configured to widen, in particular scatter, impinging light bundles along the main beam direction (B) upon entry of the first optical element (3), wherein the base portion (3a1) between cylinder diverging lenses (3a2) is flat or has a smaller curvature than the curvature of the cylinder diverging lenses (3a2), wherein the cylinder diverging lenses (3a2) are formed in the light entry surface (3a) such that the cylinder axes (c1) of the cylinder diverging lenses (3a2) are parallel to each other, wherein the light exit surface (4b) of the second optical element (4) comprises a base portion (4b1), in which a plurality of convex cylinder converging lenses (4b2) is formed, wherein adjacent cylinder converging lenses (4b2) are spaced from each other, wherein each cylinder converging lens (4b2) has a cylinder axis (c2), preferably oriented essentially orthogonal to the main beam direction (B), wherein the cylinder converging lenses (4b2) are configured to converge and narrow, in particular focus, impinging light bundles along the main beam direction (B) upon exit of the second optical element (4), wherein the base portion (4b1) between cylinder converging lenses (4b2) is flat or has a smaller curvature than the curvature of the cylinder converging lenses (4b2), wherein the cylinder converging lenses (4b2) are formed in the light exit surface (4b) such that the cylinder axes (c2) of the cylinder converging lenses (4b2) are parallel to each other, wherein the cylinder diverging lenses (3a2) are oriented on the light entry surface (3a) of the first optical element (3) such that the cylinder axes (c1) of the cylinder diverging lenses (3a2) are rotated by a first angle (a1) around a main axis (x), which is parallel to the main beam direction (B), wherein the cylinder converging lenses (4b2) are oriented on the light exit surface (4b) of the second optical element (4) such that the cylinder axes (c2) of the cylinder converging lenses (4b2) are rotated by a second angle (a2) around the main axis (x), and wherein the first angle (a1) and the second angle (a2) are such that in a frontal view towards the light exit surface (4b) of the second optical element (4) the cylinder diverging lenses (3a2) overlap with the cylinder converging lenses (4b2) in order to form a lattice.

2. The signal lamp according to claim 1, wherein the first angle (a1) and the second angle (a2) are such that a cylinder diverging lens (3a2) overlaps with at least two adjacent cylinder converging lenses (4b2).

3. The signal lamp according to claim 1, wherein the difference between the first angle (a1) and the second angle (a2) is at least 45°.

4. The signal lamp according to claim 1, wherein the lattice is a rectangular lattice, wherein each rectangle of the rectangular lattice comprises a first pair of parallel edges and a second pair of parallel edges, wherein a pair of adjacent cylinder diverging lenses (3a2) form the first pair of parallel edges and a pair of adjacent cylinder converging lenses (4b2) form the second pair of parallel edges.

5. The signal lamp according to claim 1, wherein at least some light sources of the plurality of light sources (2a) are configured to be individually controllable, wherein the signal lamp (1) comprises a light source controller, configured to control the illumination of the at least some individually controllable light sources.

6. The signal lamp according to claim 1, wherein the illuminant (2) comprises a plurality of collimators (2b), corresponding with the plurality of light sources (2a), said collimators (2b) are disposed between the plurality of light sources (2a) and the first optical element (3), wherein each collimator (2b) is associated with a corresponding light source of the plurality of light sources (2a), wherein each collimator (2b) is configured to receive light from its corresponding light source (2a), parallelize the received light, and to emit the parallelized light towards the light entry surface (3a) of the first optical element (3).

7. The signal lamp according to claim 1, wherein each cylinder diverging lens (3a2) of the plurality of cylinder diverging lenses (3a2) has the same cylinder radius.

8. The signal lamp according to claim 1, wherein each cylinder converging lens (4b2) of the plurality of cylinder converging lenses (4b2) has the same cylinder radius.

9. The signal lamp according to claim 1, wherein the cylinder diverging lenses (3a2) and the cylinder converging lenses (4b2) have the same radius.

10. The signal lamp according to claim 1, wherein a normal distance between cylinder surfaces of adjacent cylinder diverging lenses (3a2) is at least equal to or larger than a cylinder radius of a cylinder diverging lens (3a2), or wherein a normal distance between cylinder axes (c1) of adjacent cylinder diverging lenses (3a2) is at least equal to or larger than a cylinder diameter of a cylinder diverging lens (3a2).

11. The signal lamp according to claim 1, wherein a normal distance between cylinder surfaces of adjacent cylinder converging lenses (4b2) is at least equal to or larger than a cylinder radius of a cylinder converging lens (4b2), or wherein a normal distance between cylinder axes (c2) of adjacent cylinder converging lenses (4b2) is at least equal to or larger than a cylinder diameter of a cylinder converging lens (4b2).

12. The signal lamp according to claim 1, wherein a normal distance between cylinder surfaces of adjacent cylinder diverging lenses (3a2) is equal to a normal distance between cylinder surfaces of adjacent cylinder converging lenses (4b2).

13. The signal lamp according to claim 1, wherein the normal distance between the light exit surface (3b) of the first optical element (3) and the light entry surface (4a) of the second optical element (4) is at least twice the cylinder radius of the cylinder diverging lenses (3a2) or the cylinder converging lenses (4b2).

14. The signal lamp according to claim 1, wherein the blocking means comprise a shade element or a non-transparent layer disposed between adjacent cylinder diverging lenses (3a2).

15. A vehicle comprising a signal lamp according to claim 1.

16. The signal lamp according to claim 1, wherein:
the light exit surface (3b) is flat or curved;
the light entry surface (4a) is flat or curved;
the normal distance between the light exit surface (3b) of the first optical element (3) and the light entry surface (4a) of the second optical element (4) is greater than zero and the same along the entire light exit surface (3b) and light entry surface (4a) respectively;
the adjacent cylinder diverging lenses (3a2) are spaced at equal distance from each other;
the cylinder axis (c1) is oriented essentially orthogonal to the main beam direction (B);
the adjacent cylinder converging lenses (4b2) are spaced at equal distance from each other; or
a combination thereof.

17. The signal lamp according to claim 2, wherein the first angle (a1) and the second angle (a2) are such that a cylinder diverging lens (3a2) overlaps with three adjacent cylinder converging lenses (4b2).

18. The signal lamp according to claim 3, wherein the difference between the first angle (a1) and the second angle (a2) is more than 75°.

19. The signal lamp according to claim 3, wherein the difference between the first angle (a1) and the second angle (a2) is essentially 90°.

20. The signal lamp according to claim 5, wherein all light sources of the plurality of light sources (2a) are configured to be individually controllable, wherein the light source controller is configured to control the illumination of all individually controllable light sources.

\* \* \* \* \*